July 2, 1935.  E. PETERSON  2,006,698
ELECTRICAL MEASURING SYSTEM
Filed May 26, 1934
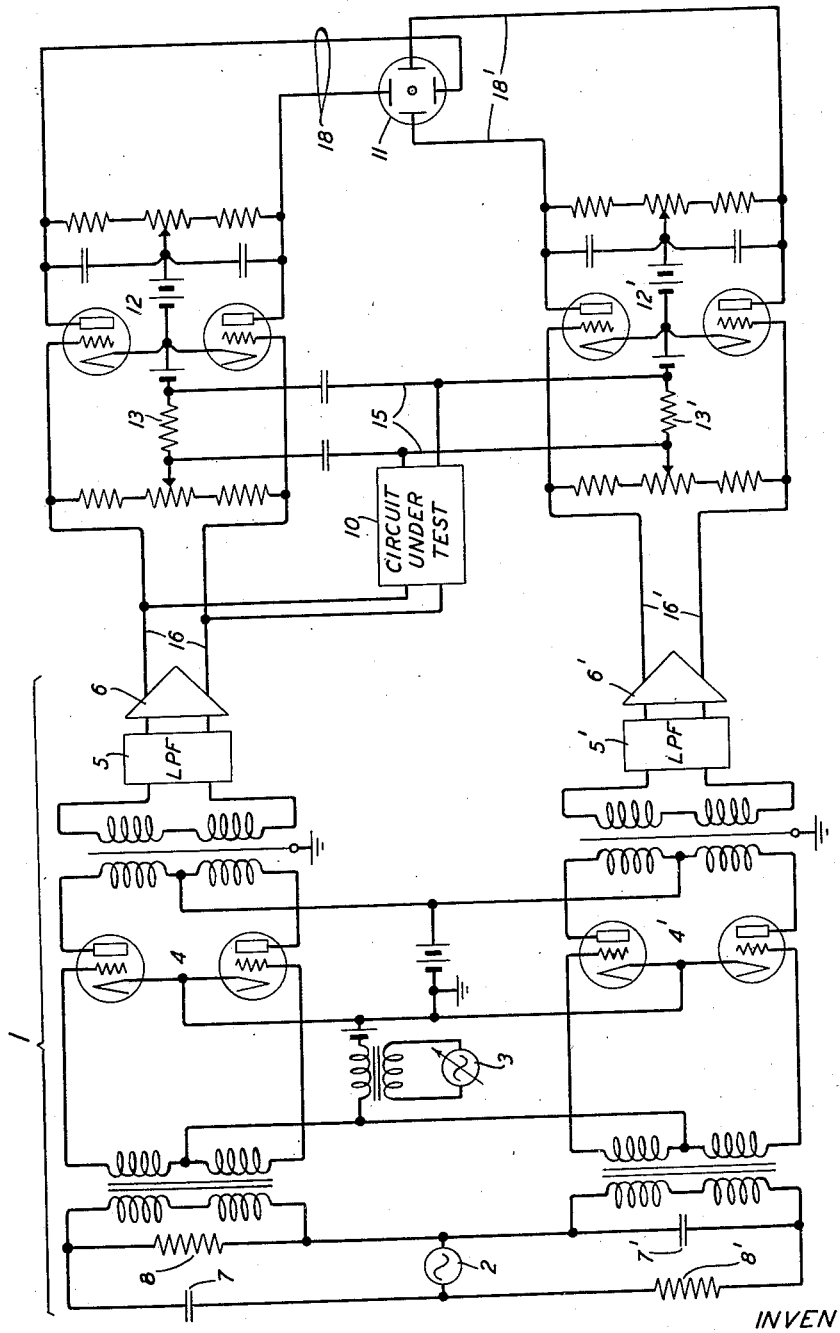
INVENTOR
E. PETERSON
BY J.H.A.Burgers
ATTORNEY Patented July 2, 1935

2,006,698

UNITED STATES PATENT OFFICE 2,006,698

ELECTRICAL MEASURING SYSTEM

Eugene Peterson, New York, N. Y., assignor to Bell Telephone Laboratories, Incorporated, New York, N. Y., a corporation of New York Application May 26, 1934, Serial No. 727,611

6 Claims. (Cl. 179—175.31)

This invention relates to measuring systems, for example, electrical wave measuring systems.

An object of the invention is to determine wave properties, as for example, to measure wave amplitude ratios or phase differences, or both.

It is also an object of the invention to measure transmission properties of wave propagating paths, as for example, to measure phase shift or attenuation, or both, in electric wave paths.

A further object is to facilitate rapid measurement of such quantities.

Attenuation is used herein as generic to loss and gain, gain being viewed as negative loss.

It is also an object of the invention to determine transfer constant polar diagrams visually.

The transmission properties of a line or network are ordinarily presented in the form of curves of attenuations and phase shift plotted against frequency. The polar diagram permits these two characteristics to be represented (for example as in H. Nyquist Patent 1,915,440, June 27, 1933) by a single curve in which the real part of the transfer factor is plotted against the imaginary part with frequency as a parameter. The polar diagram is especially useful in determining singing conditions in feedback amplifiers (for example the stabilized feedback amplifiers described in the Nyquist patent just mentioned or in H. S. Black's paper on "Stabilized Feedback Amplifiers", published in Electrical Engineering, January 1934, pages 114 to 120).

In one specific aspect the invention is a visual method or system for measuring the transfer factor of a circuit over a desired frequency range, in which the transfer factor polar diagram is obtained on the screen of a cathode ray oscillograph. The diagram can be obtained rapidly. For example, points determining the transfer factor over a frequency range extending for instance from .5 kilocycle to 15 kilocycles can be obtained in a short time of the order of a minute.

In this visual method of observation, a steady potential proportional to the in-phase component of the transfer factor is provided in a manner pointed out below and is impressed across one pair of plates of a cathode-ray oscillograph, and another steady potential proportional to the quadrature component is provided as pointed out below and is impressed across the other pair of plates, the constant of proportionality being the same for the two components. Consequently, the transfer factor at any frequency appears as a single point, the vector from the origin to the displaced beam constituting the transfer factor. The locus of all these points, i. e., vector tips, over the frequency range constitutes the transfer factor polar diagram.

To provide the unidirectional potentials proportional to the in-phase and to the quadrature components respectively, use is made of the fact that the output voltage of a vacuum tube wattmeter of the type disclosed, for example, in my Patent 1,586,533, June 1, 1926, is a steady component or unidirectional voltage proportional to the product of the two input voltages multiplied by the cosine of the angle between them. (The wattmeter disclosed in that patent is a balanced, conjugate input modulator in which the two inputs are of the same frequency.) If one of the two input voltages is also the input voltage for the amplifier or circuit under test and the other is the output voltage from that test circuit, then as the frequency is varied, with constant input voltage for the test circuit, the wattmeter output voltage will be proportional to the real part of the transfer factor. Now if in a second such wattmeter we have one input voltage (provided for example by a two-phase oscillator constructed in accordance with the present invention as disclosed hereinafter) a voltage equal in amplitude and frequency to the test circuit input voltage but differing in phase by ninety degrees, and the other input against the output from the test circuit, then the resulting wattmeter output voltage will be a steady component or unidirectional voltage proportional to the imaginary part of the transfer factor. Thus the output voltages of the two wattmeter circuits are two voltages measurable, for example, by a vacuum tube voltmeter or two direct current meters as voltages proportional, by the same proportionality constant, to the real and the imaginary components of the transfer factor. (Though the proportionality factor is here termed a proportionality constant, in reality it may be a variable, for example in case the wattmeter output circuits include volume or amplitude range compressors, such for instance as low frequency or direct current amplifiers whose gains are controlled by the amplitude of the output from the test circuit so that the proportionality factor will be logarithmic instead of linear.) If these two steady or unidirectional voltages from the wattmeter output circuits be applied to the deflector plates of a cathode-ray oscillograph, the spot produced on the screen by the beam will trace a pattern corresponding to the desired transfer factor polar diagram as the frequency of the input voltages for the test circuit and the wattmeters is swept over the necessary range.

The two-phase oscillator mentioned above is a heterodyne oscillator which supplies two voltages of 90° phase difference and of constant amplitude and of frequency variable over the range over which it is desired to measure the transfer factor of the test circuit, as for example the range from 0.5 kilocycle to 15 kilocycles. One of the two voltages is supplied to the input of the test circuit and to the wattmeter input circuit that is connected to the input of the test circuit. The voltage of the other phase is supplied to the input of the other wattmeter circuit. For the production of these two voltages, the oscillator has two independent sources each common to two push-pull modulators. One of these sources is of constant frequency, for example, 100 kilocycles. The other is variable in frequency (yet practically constant in amplitude) over the frequency range, say from 100 to 130 kilocycles. The variable frequency source is connected to the common branch of the input circuits of each modulator. The fixed frequency source is connected in series with the grid circuits of each of the modulators. Phase shifting means, as for example resistance-capacity networks, are provided in the circuits of the fixed frequency source to produce a phase difference of 90° between the voltage that this source supplies to one of the modulators and the voltage that this source supplies to the other modulator. Consequently, there is a 90° phase difference between the beat frequency output of the one modulator and that of the other modulator, and this phase difference is preserved in the outputs of the two modulators when the frequency of the variable frequency oscillator is varied over the range from about 100.5 to 130 kilocycles. The outputs of the two modulators are the two voltages supplied, as indicated above, one to the input of the test circuit and to the wattmeter input circuit that is connected to the input of the test circuit, and the other to the input of the other wattmeter circuit.

Other objects and aspects of the invention will be apparent from the following description and claims.

The single figure of the drawing shows a measuring circuit embodying the specific aspect of the invention referred to above.

In the drawing, a heterodyne oscillator 1 comprises a fixed frequency voltage source 2, a variable frequency voltage source 3, and push-pull modulators 4 and 4' fed from the oscillators to produce in the modulator output circuits two voltages of variable frequency and constant and equal amplitude, in quadrature phase relation, all as referred to above.

The modulators may be regarded as including low-pass filters 5 and 5' and amplifiers 6 and 6'. The filters attenuate any components of the primary frequencies that might pass through the modulators. The amplifiers may be of the feedback stabilized type referred to above, with a large amount of feedback that reduces both the variation in gain and phase shift to negligible proportions and at the same time reduces any harmonic production in the amplifiers to a point at which it is negligible compared to the harmonics existing in the outputs of the primary sources 2 and 3.

The sources 2 and 3 may be vacuum tube oscillators, the oscillator 2 being set for a fixed frequency, for example 100 kilocycles, and the oscillator 3 having its frequency adjustable, for example over the range from 100 to 130 kilocycles. The output voltages of these oscillators 2 and 3 are delivered from directly across their tuned circuits (not shown), thus reducing the amplitude of harmonics present in their output waves.

The variable frequency voltage from oscillator 3 is fed into the mid-branch of the input circuits of each of the conjugate input, balanced modulators 4 and 4', thus reducing to a minimum the number of variable frequency unwanted products appearing in the modulator outputs.

The fixed frequency voltage from oscillator 2 is fed through a phase splitting network comprising capacities 7 and 7' and resistances 8 and 8' to the modulator inputs. The phase splitting network, being connected in the output of the fixed frequency oscillator, is required to operate at only a single frequency. It can, therefore, consist of a simple capacity resistance circuit. The elements of the network may be variable around computed values, for adjustment by trial in the final circuit until exact phase quadrature and amplitude equality of voltages is obtained. The effects of higher order modulation products, tube capacities and slight departures of the primary frequency from its design value are thus automatically taken into account.

The two-phase heterodyne oscillator supplies voltages which may be used, for example, in testing a circuit 10, as for instance in determining the transfer factor polar diagram of the test circuit 10 by a visual method employing a cathode ray oscillograph 11 and two vacuum tube wattmeters 12 and 12', all as referred to above.

The test circuit 10 may be, for example, the feedback loop of a stabilized feedback amplifier of the type referred to above, the polar diagram of the transfer factor around the feedback loop being desired; and then the circuit 7 is the circuit obtained by opening the loop at any point which provided convenient impedances looking in both directions from the break, and properly terminating the loop at each side of the break in impedances insuring that the oscillator and measuring circuit impedances connected to the input and output of the circuit 7 are equal to the output and input impedances respectively of the circuit 10 under test, in order that the transfer factor in the measuring condition may not differ significantly from that existing in the operating condition.

The common branches 13 and 13' of the input circuits of the wattmeters 12 and 12' are shown connected in parallel across the output of the circuit 10 under test, through leads 15. The output voltage of modulator circuit 4 is supplied from amplifier 6 through leads 16 to the input of test circuit 10 and the series input terminals of wattmeter 12 in parallel. (If desired, the conjugate inputs to wattmeter 12 can be interchanged and the conjugate inputs to wattmeter 12' can be interchanged.) The rectified output of the wattmeter 12, therefore, is proportional to the product of the test circuit input and output voltages multiplied by the cosine of the transfer factor phase angle. This potential is supplied through leads 18 to one pair of plates of oscillograph 11. To the series input terminals of wattmeter 12', through leads 16', is applied the output voltage of modulator circuit 4', from amplifier 6'. This voltage is equal in amplitude to the test circuit input voltage but lags 90° behind it. The rectified output of this wattmeter is proportional to the product of the test circuit input and output voltages multiplied by the cosine of the transfer factor phase angle minus 90°, or in other words, proportional to the sine of the transfer factor phase angle. This voltage is supplied through leads 18' to those plates of oscillograph 11 which produce a deflection at right angles to that produced by the plates connected to leads 18. We have then across one pair of plates of the oscillograph a steady potential proportional to the real component of the transfer factor, and across the other pair a steady potential proportional to the imaginary component of the transfer factor. These two components act upon the beam of the oscillograph to produce a deflection which in amplitude and in phase is the resultant of the two component deflections and so corresponds to the transfer factor.

What is claimed is:

1. The method which comprises producing a first, a second and a third wave, said first and third waves being equal in amplitude and being in phase quadrature to each other, producing from said first and second waves a unidirectional force having a given proportionality to the product of their amplitudes multiplied by the cosine of the phase angle between them, and producing from said third and second waves a unidirectional force having the same proportionality to the product of their amplitudes multiplied by the cosine of the phase angle between them.

2. A system for comparing characteristics of a first wave and a second wave, comprising means for producing a third wave of amplitude equality with said first wave but in phase quadrature thereto, means for producing from said first and second waves a unidirectional force having a given proportionality to the product of their amplitudes multiplied by the cosine of the phase angle between them, and means for producing from said third and second waves a unidirectional force having the same proportionality to the product of their amplitudes multiplied by the cosine of the phase angle between them.

3. A system for obtaining the vector ratio of a first voltage wave and a second voltage wave, comprising means for producing a third voltage wave of amplitude equality with but in phase quadrature to said first wave, means for producing from said first and second waves a unidirectional voltage having a given proportionality to the product of their amplitudes multiplied by the cosine of the phase angle between them, means for producing from said third and second waves a unidirectional voltage having the same proportionality to the product of their amplitudes multiplied by the cosine of the phase angle between them, and means for indicating the relative magnitudes of said unidirectional forces, said second mentioned means comprising a balanced modulator and means for supplying said first and second waves to conjugate branches, respectively, of its input circuit, and said third mentioned means comprising a balanced modulator and means for supplying said third and second waves to conjugate branches, respectively, of its input circuit.

4. A system for determining the transfer constant polar diagram of a circuit, comprising means supplying to said circuit a first voltage wave for producing in the output of said circuit a second voltage wave, means for varying the frequency of said first wave, means for producing a third voltage wave of frequency and amplitude equality with but in phase quadrature to said first wave, means for producing from said first and second waves a unidirectional voltage having a given proportionality to the product of their amplitudes multiplied by the cosine of the phase angle between them, means for producing from said third and second waves a unidirectional voltage having the same proportionality to the product of their amplitudes multiplied by the cosine of the phase angle between them, and a cathode ray oscillograph having means responsive to one of said unidirectional voltages for deflecting the oscillograph beam in one direction and means responsive to said other unidirectional voltage for deflecting the beam in a direction at right angles to said one direction.

5. The combination with a two-phase heterodyne oscillator producing a first wave and a third wave, said waves being of equal amplitude and in quadrature phase relation, of means for comparing characteristics of said first wave and a second wave, said means comprising means for producing from said first and second waves a unidirectional voltage having a given proportionality to the product of their amplitudes multiplied by the cosine of their phase difference, and means for producing from said third and second waves a unidirectional voltage having the same proportionality to the product of their amplitudes multiplied by the cosine of their phase difference.

6. A multiphase heterodyne oscillator for producing voltages of different phases and variable frequency, comprising primary sources, modulators, a phase shifting network connecting one of said sources with two of said modulators, means for varying the frequency of another of said sources, and means connecting said other source to said two modulators.

EUGENE PETERSON.